United States Patent [19]
Onodera

[11] Patent Number: 5,197,330
[45] Date of Patent: Mar. 30, 1993

[54] REGULATOR
[75] Inventor: Athushi Onodera, Hohya, Japan
[73] Assignee: Koganei, Ltd., Tokyo, Japan
[21] Appl. No.: 669,349
[22] Filed: Mar. 14, 1991
[30] Foreign Application Priority Data Jul. 19, 1990 [JP] Japan ................ 2-76983[U]
Jul. 19, 1990 [JP] Japan ................ 2-76984[U]
Sep. 5, 1990 [JP] Japan ................ 2-93489[U]

[51] Int. Cl.⁵ .................................. G01L 7/00
[52] U.S. Cl. ............................. 73/431; 73/714; 73/756; 137/557
[58] Field of Search .................. 73/431, 756, 714; 116/34 R; 137/557

[56] References Cited
U.S. PATENT DOCUMENTS

| | | | |
|---|---|---|---|
| 3,981,199 | 9/1976 | Moore et al. | 73/756 |
| 4,182,367 | 1/1980 | Day | 73/756 |
| 4,387,600 | 6/1983 | Kranz | 73/714 |
| 4,622,857 | 11/1986 | Nelson | 73/714 |
| 4,838,865 | 6/1989 | Flank et al. | 73/756 |

Primary Examiner—Donald O. Woodiel
Attorney, Agent, or Firm—McGlew and Tuttle

[57] ABSTRACT

A regulator for pneumatic system comprising a connecting bracket for connecting other air conditioning units to a regulator body. Because of this connecting bracket, the air conditioning units to be connected to each other can be modularized. The connecting bracket has, at its both ends, a pair of projection-like pawl sections which are engageable respectively with engaging sections formed respectively on outer peripheral surfaces of the other air conditioning units. Incorporated in the connecting bracket is a pressure gage for detecting secondary pneumatic pressure within the regulator body. The pressure gage comprises a pressure detecting section, a pressure display section, pressure setting section and an abnormality alarm section.

6 Claims, 12 Drawing Sheets

REGULATOR

BACKGROUND OF THE INVENTION

1. Field of the Invention

The present invention relates to a regulator serving as one of air conditioning units in a pneumatic system, and, more particularly, to a technique applied to a structure for connecting a regulator with other air conditioning units. The term "air conditioning unit" is used here in a broad sense including not only a regulator, a filter, a lubricator, etc., but also a pipe coupling.

2. Related Art Statement

As a regulator or the structure for connection of other air conditioning units to the regulator in a pneumatic system, the following arrangement is considered, for example:

Specifically, in the case where a single unit of the regulator is connected to pipes, the structure for connection of the air conditioning unit is arranged such that a pipe on the upstream side is connected to an inflow port of a regulator body by means of threaded engagement, and a pipe on the down stream side is connected to an outflow port of the regulator body by means of threaded engagement.

Further, in the case where a filter is connected to the regulator, a structure for connection of the air conditioning units is arranged such that the filter is connected to the inflow port of the regulator body through a nipple, and a pipe is connected to the outflow port of the regulator body by threaded engagement.

Furthermore, in the case where the filter and a lubricator are connected to the regulator, a structure for connection of the air conditioning units is arranged such that the filter is connected to the inflow port of the regulator body through the nipple, and the lubricator is connected to the outflow port of the regulator body through a nipple.

However, the structure for connection of the air conditioning units in the case where the regulator is used by itself has the following problem. That is, since the pipe on the upstream side and the pipe on the downstream side are connected respectively to the inflow port and the outflow port of the regulator body by means of threaded engagement, connection of pipes different from the regulator in diameter of inflow and outflow ports is impossible so that it is difficult to select the pipe diameter.

Furthermore, the structure for connection of the air conditioning units in the case where the filter is connected to the regulator has the following problem. That is, the filter is connected to the inflow port of the regulator through the nipple, and the pipe is connected to the outflow port of the regulator body. Thus, not only the entire length increases, but also selection of the pipe diameter is made difficult.

Moreover, there is the following problem. That is, if the filter and the lubricator are connected to the regulator such that the filter and the lubricator are directed or oriented in the same direction as the regulator, loosening of the nipples generates leakage of air.

The structure for connection of the air conditioning units in the case where the filter and the lubricator are connected to the regulator has the following problem. That is, the arrangement is such that the filter and the lubricator are connected respectively to the inflow and outflow ports of the regulator body through the nipples. Thus, the entire length further increases, and the number of parts also increases. Further, mounting or attaching is troublesome and cumbersome.

Furthermore, there is the following problem. That is, if the filter and the lubricator are connected to the regulator such that the filter and the lubricator are directed in the same direction as the regulator, loosening of the nipples will cause air leakage.

Moreover, it is desired to mount a pressure gage on the regulator in order to detect pressure within the regulator body of the regulator.

An example of the structure for mounting the pressure gage on the regulator is disclosed, for example, in Japanese Utility Model Laid-Open No. 62-121494.

Specifically, the structure for mounting the pressure gage to the regulator is arranged such that the pressure gage is mounted to the outer peripheral surface of the regulator body, and the periphery of the regulator body is covered with a cover made of synthetic resin under such a condition that the pressure gage projects.

However, the aforesaid structure for mounting the pressure gage to the regulator has the following problem. That is, at mounting of the pressure gage, the pressure gage is mounted to the outer peripheral surface of the regulator body, and the periphery of the regulator body is covered with the cover under the condition that the pressure gage projects. Further, at demounting of the pressure gage, it is necessary that the cover is removed and, subsequently, the pressure gage is removed from the regulator body. Thus, mounting and demounting of the pressure gage are troublesome and cumbersome.

Further, the structure for mounting the pressure gage on the regulator has the following problem. That is, the pressure gage is mounted to the outer peripheral surface of the regulator body, and the periphery of the regulator body is covered with the cover under the condition that the pressure gage projects. Accordingly, not only the regulator increases in size correspondingly to the cover, but also the regulator is made to look less attractive with respect to the external appearance.

Further, it is desired to display, in a viewable manner, detected pressure of the pressure gage to confirm the detected pressure from the outside.

As the regulator of the kind referred to above having the pressure display function, there is the following one. That is, a pressure gage of Bourdon-tube type, which communicates with a secondary passage of the regulator, that is, with a passage thereof on the outflow side, to detect secondary pressure, is mounted on the regulator body by means of threaded engagement. The secondary pressure is detected and can be displayed by an indicating needle.

For the structure of the regulator having the pressure display unit, however, various problems have been pointed out in the present when reduction in size of a regulator and integration thereof have advanced.

For example, in the case where the regulator is to be reduced in size, there is the following disadvantage or defect. That is, there is a limit in reduction in size of the pressure gage of Bourdon-tube type, and accuracy in measurement is extremely deteriorated.

In this case, the following problems arise. That is, it is particularly impossible to directly mount the pressure gage on a regulator of manifold-type. The pressure gage must be mounted at a different place to practice detection through the pipes.

Furthermore, there are the following problems. That is, the function of the pressure gage of the above-described type is only pressure display, and the pressure gage does not have a pressure-detection function and an abnormality detection function attendant thereupon. In the case, for example, where the secondary pressure abnormally deviates from the setting pressure, it is impossible to cope with the abnormality.

Moreover, the above-described structure has the following problem. That is, it is difficult to respond with respect to repeated pressure fluctuation, and breakage occurs in a driving system for the needle and the like.

Accordingly, there are the following problems. That is, the conventional pressure gage of Bourdon-tube type has the above-discussed problems not only in the functional aspect, but also in the structural aspect. Further, it is difficult to cope with reduction in size of the pneumatic-pressure instruments of the present day and integration thereof.

SUMMARY OF THE INVENTION

It is an object of the invention to provide a regulator in which connection of pipe couplings or various other air conditioning units to the regulator can be modularized.

It is another objects of the invention to provide a structure of mounting a pressure gage on a regulator, in which mounting and demounting of the pressure gage on and from the regulator are made easy, the size of the regulator can be reduced, and the regulator is made to look more attractive on external appearance.

It is still another object of the invention to provide a regulator having a pressure display unit capable of practicing pressure detection, pressure display, pressure setting and abnormality detection in secondary pressure of the regulator.

It is another object of the invention to provide a regulator having a pressure display unit, which makes it possible to facilitate mounting and demounting of the pressure display unit and in which reduction in size and integration can be attained.

Of various embodiments disclosed in this invention, the outline of typical ones will briefly be described as follows:

A regulator according to the invention is provided with a connecting bracket for connecting other air conditioning units to the regulator under such a condition that the other air conditioning units are fitted in the regulator in a sealed manner. A structure for connection of the air conditioning units to the regulator is modularized by the connecting bracket.

According to the regulator of the invention, various air conditioning units can be connected to the regulator by the connecting bracket, and connection of the air conditioning units to the regulator can be modularized.

Particularly, in the case where the regulator is used in a single unit, it is possible to optionally select the diameter of pipes connected respectively to inflow and outflow ports of the regulator body.

Further, in the case where a filter is connected to the regulator, the entire length can be reduced, and the pipe diameter on the outflow side can optionally be selected. Furthermore, not only the number of parts can be reduced, but also the ability to attach or mount can be improved. It is possible to connect the filter to the inflow port of the regulator body, without occurrence of air leakage, such that the filter is directed or oriented in the same direction as the regulator.

Further, in the case where the filter and a lubricator are connected to the regulator, the entire length can further be reduced, the number of parts can be reduced, and the mounting ability can be improved. In addition, it is possible to connect the filter and the lubricator to the inflow and outflow ports of the regulator body, without occurrence of air leakage, such that the filter and the lubricator are directed in the same direction as the regulator.

Moreover, a structure for mounting a pressure gage on the regulator, according to the invention, is arranged such that a connecting bracket is provided for connecting the other air conditioning units to the regulator such that the other air conditioning units are fitted in the regulator in a sealed manner, and the pressure gage is incorporated in the connecting bracket. With this arrangement, it is possible to mount the pressure gage on the regulator simultaneously with mounting of the connecting bracket. Further, it is possible to modularize the connection of the air conditioning units to the regulator.

Furthermore, since the arrangement is such that the connecting bracket having incorporated therein the pressure gage is demountable, it is possible to easily mount and demount the pressure gage together with the connecting bracket.

Moreover, the structure in which the pressure gage is incorporated in the connecting bracket enables the regulator to be reduced in size, making it possible to make the regulator look more attractive on external appearance.

Another regulator according to the invention is of such a structure as to have a pressure display unit or a pressure gage which comprises a pressure detecting section for detecting the secondary pressure of the regulator, a pressure display section for displaying the detected secondary pressure, a pressure setting section for setting the secondary pressure, and an abnormality alarm section for giving the alarm for abnormality deviating from the set pressure.

The regulator having the pressure gage, according to the invention, is of such a structure that the pressure gage is incorporated in or assembled with the connecting bracket for connecting the other air conditioning units to the regulator.

According to the above-described regulator having the pressure gage, the secondary pressure of the regulator can be detected by the pressure detecting section, the detected secondary pressure can be displayed by the pressure display section, the secondary pressure can be set by the pressure setting section, and the alarm of abnormality deviating from the set secondary pressure can be given by the abnormality alarm section.

Accordingly, control of the actuator can be made possible on the basis of the alarm from the abnormality alarm section.

Further, since the arrangement is such that the pressure gage is incorporated in the connecting bracket, there are produced advantages, in addition to the aforesaid advantages, that mounting and demounting of the pressure gage can be made easy, and reduction in size and integration can be attained.

The above and other objects and features of the present invention will become more apparent when referred to the following descriptions given in conjunction with the accompanying drawings.

DETAILED DESCRIPTION OF THE PREFERRED EMBODIMENTS

Figure 1A:
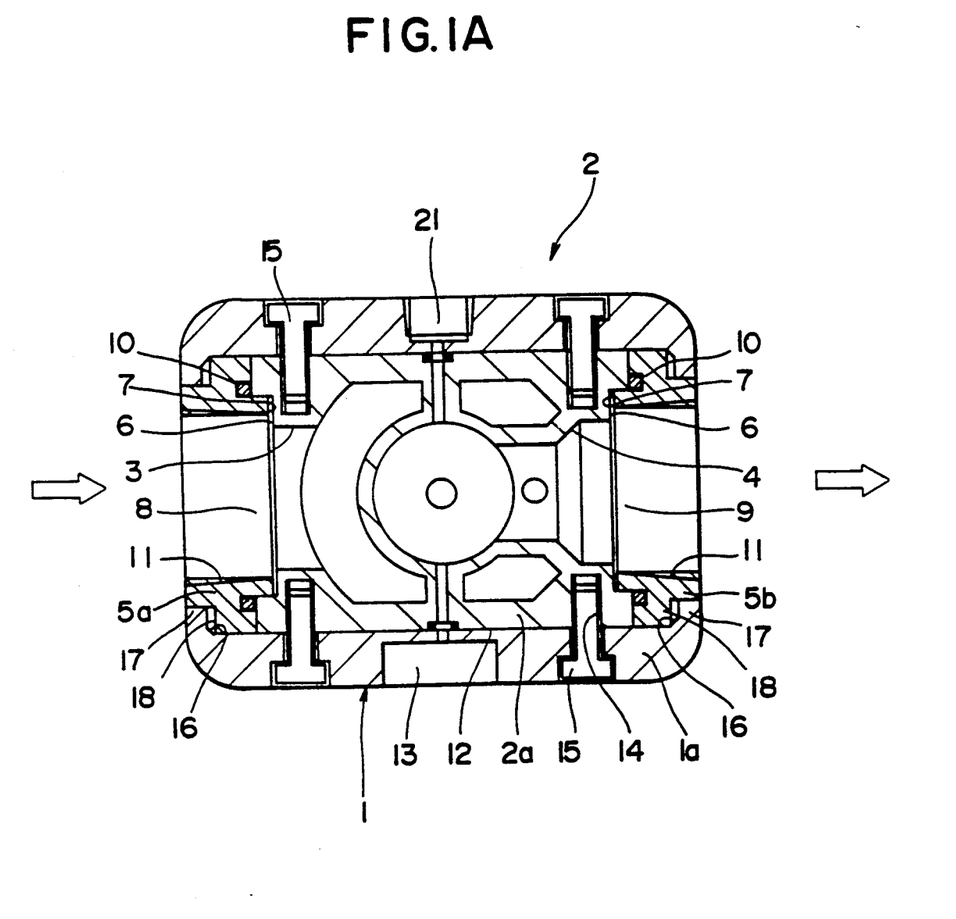
FIGS. 1A and 1B are respectively a cross-sectional view taken along the line IA—IA in FIG. 1B and a side elevational view of a structure for connection of air conditioning units in the case where a regulator is used in a single unit.
Figure 1B:
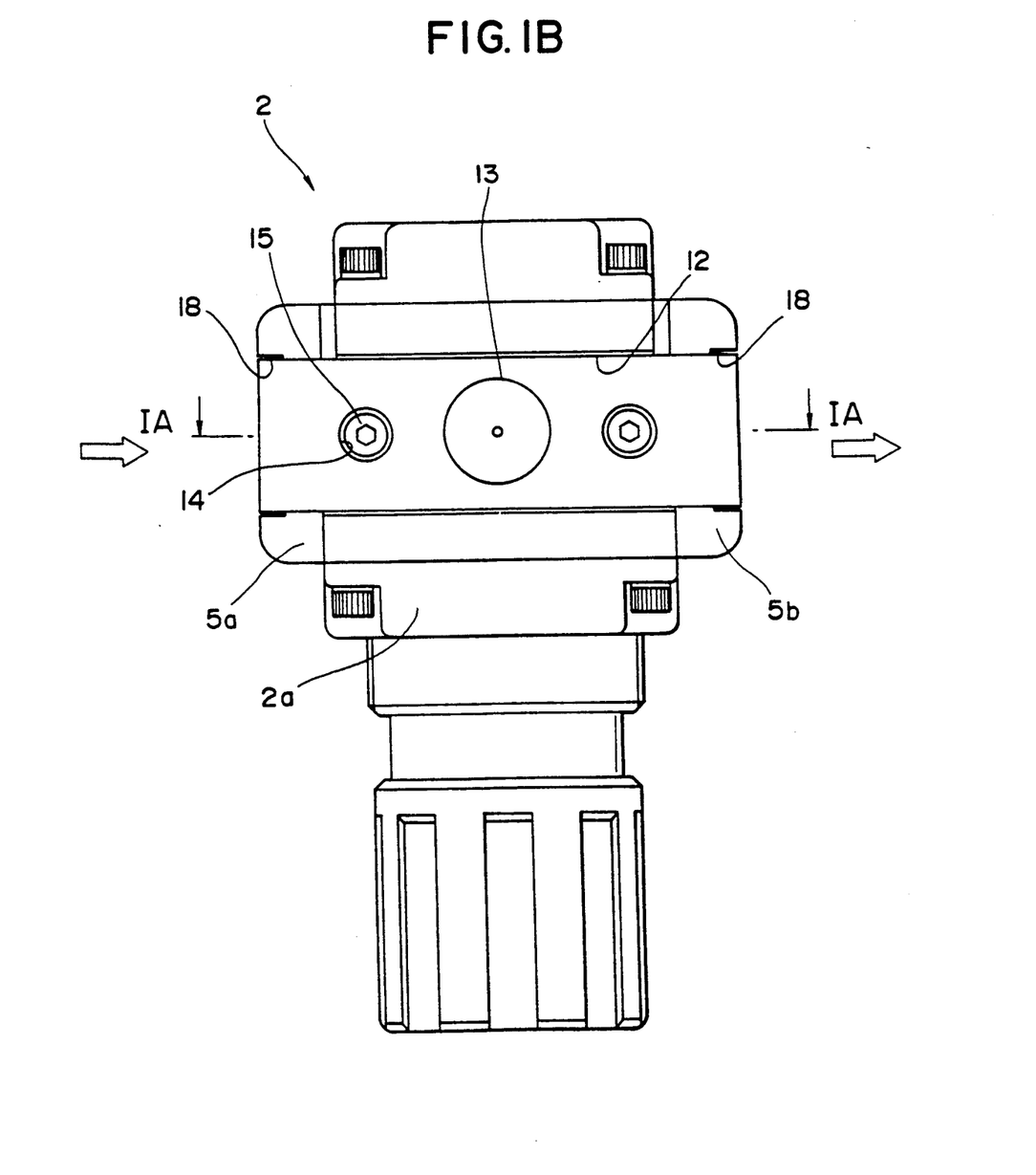

Referring first to FIGS. 1A and 1B, there is shown a regulator according to an embodiment of the invention, generally designated by the reference numeral 2. The regulator 2 is arranged such that a pair of pipe couplings as ones of air conditioning units are connected to a single unit of the regulator.

Specifically, a structure for connection of the air conditioning units in the case of the regulator used in a single unit illustrated in FIGS. 1A and 1B is arranged such that a regulator body 2a has a pair of inflow and outflow ports 3 and 4, and a pair of pipe couplings 5a and 5b can be connected respectively to the inflow and outflow ports 3 and 4 of the regulator body 2a by a connecting bracket 1.

That is, both the inflow and outflow ports 3 and 4 of the regulator body 2a have their respective female stepped opening ends 6 and 6. Male stepped opening ends 7 and 7 corresponding respectively to the female stepped opening ends 6 and 6 are formed respectively at an outflow port 8 of the inflow side pipe coupling 5a and an inflow port 9 of the outflow-side pipe coupling 5b. The male stepped opening ends 7 and 7 have respective O-rings 10 and 10 which seal respectively the inflow and outflow ports of the regulator body 2a when the male stepped opening ends 7 and 7 are fitted into the female stepped opening ends 6 and 6.

Further, the pipe couplings 5a and 5b have their respective inner peripheral surfaces which are formed respectively with female threaded sections 11 and 11. Pipes are connected to the regulator 2 by threaded engagement through the female threaded sections 11 and 11.

The connecting bracket 1 has a pair of bracket bodies 1a and 1a which are fitted respectively in fitting grooves 12 and 12 formed respectively in side surfaces of the regulator body 2a and extending along the flowing direction of pneumatic pressure. One of the pair of bracket bodies 1a has its center at which a pressure-gage accommodating section 13 is provided. A port 21 is provided at the center of the other bracket body 1a. A pair of mounting bores 14 are formed on both sides of each of the pressure-gage accommodating section 13 and the port 21. Thus, the pair of mounting bores 14 are arranged in symmetrical relation to each other.

Further, each of the bracket bodies 1a and 1a has its both ends which are formed respectively with tapering sections 16 and 16. When the bracket body 1a is mounted to the fitting groove 12 in the regulator body 2a, the tapering sections 16 and 16 urge the pipe couplings 5a and 5b respectively against the inflow and outflow ports 3 and 4 in the regulator body 1a.

A pair of a pawl sections 17 and 17 in the form of projection are formed respectively in contiguous relation to the tapering sections 16 and 16. The pawl sections 17 and 17 are hooked respectively to a pair of engaging sections 18 and 18 formed on the outer peripheries of the pipe couplings 5a and 5b.

Figure 2A:
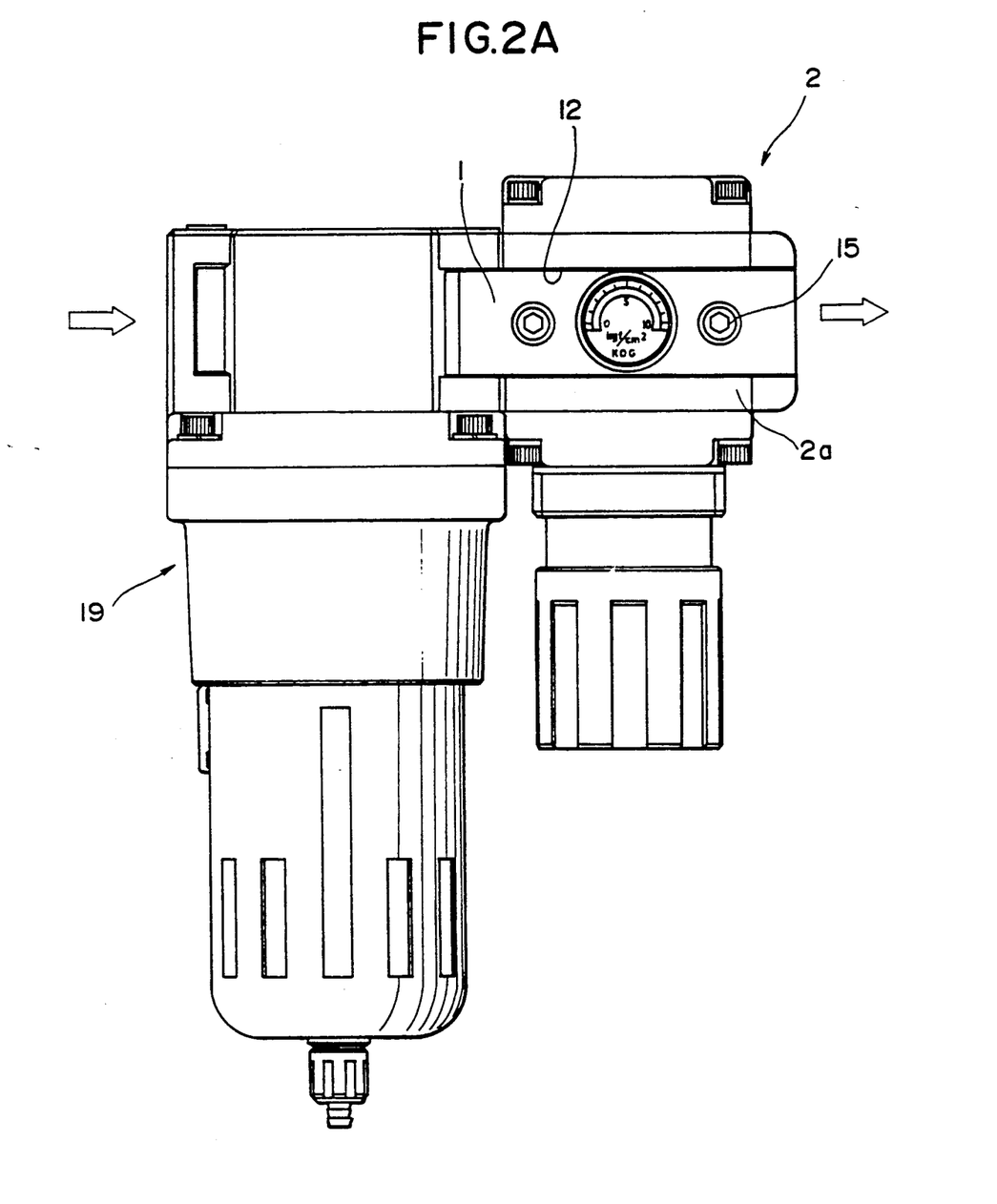
FIGS. 2A and 2B are respectively a side elevational view and a top plan view of the structure for connection of the air conditioning units in the case where a filter is connected to the regulator.
Figure 2B:
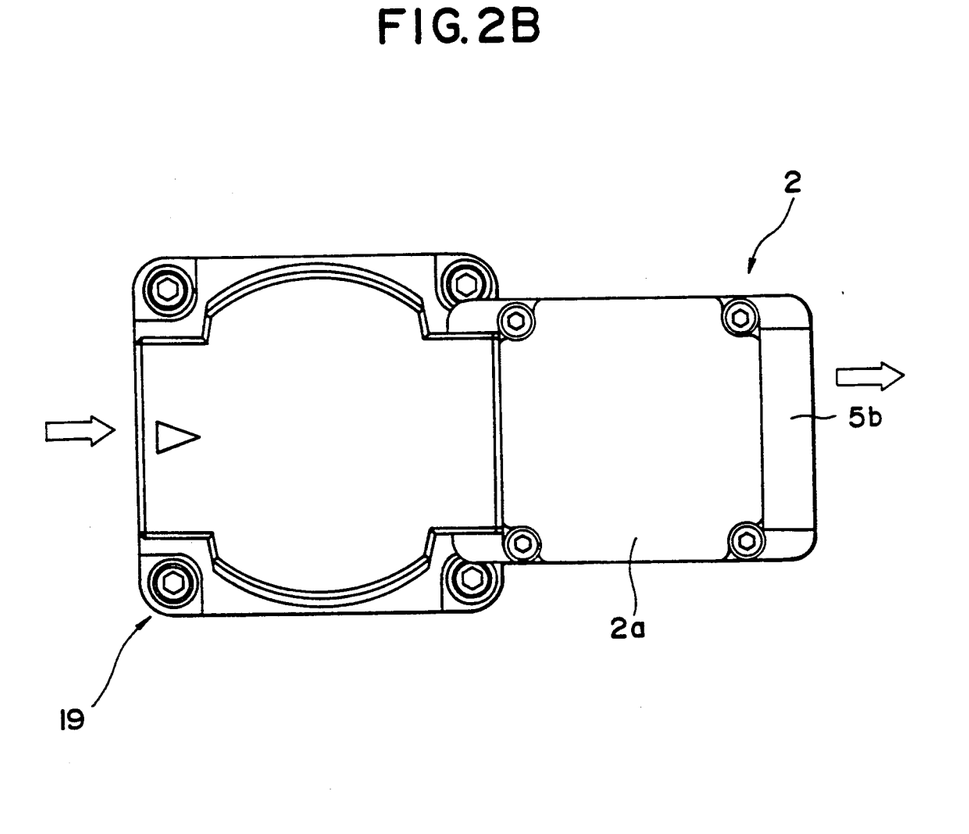

As shown in FIGS. 2A and 2B, the structure for connection of the air conditioning units in the case where a filter 19 is connected to the regulator 2 is of a modular structure in which the filter 19 and the pipe coupling 5b are connectable to the inflow and outflow ports of the regulator body 2a by the connecting bracket 1. The connecting structure has the connecting bracket 1 and the pipe coupling 5b on the outflow side similar to the aforesaid case of the regulator only.

The outflow port of the filter 19 has its structure substantially similar to the case of the pipe coupling 5a on the inflow side.

Figure 3A:
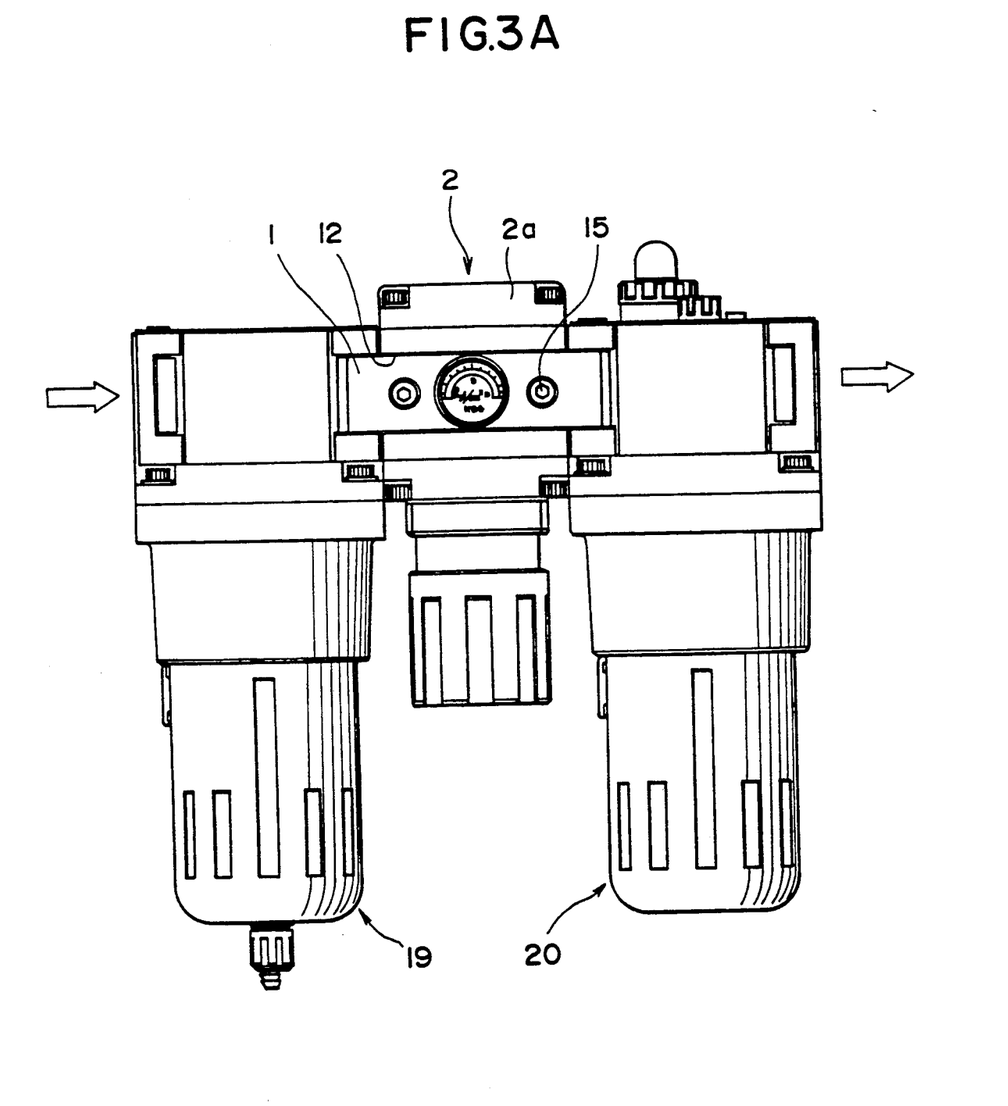
FIGS. 3A and 3B are respectively a side elevational view and a top plan view of the structure for connection of the air conditioning units in the case where the filter and a lubricator are connected to the regulator.
Figure 3B:
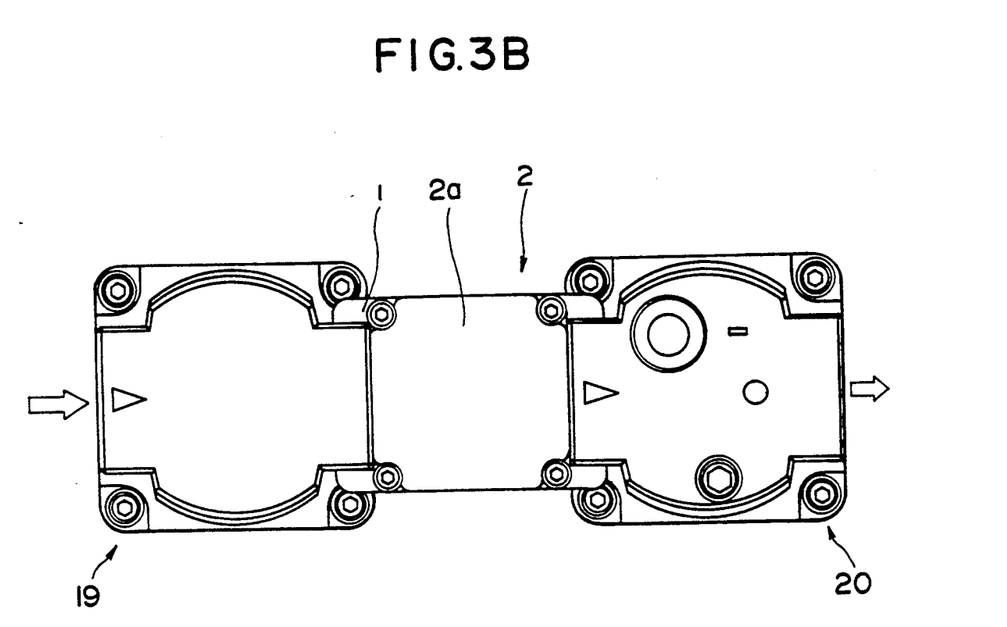

As shown in FIGS. 3A and 3B, the structure for connection of the air conditioning units in the case where the filter 19 and a lubricator 20 are connected to the regulator 2 is of a modular structure in which the filter 19 and the lubricator 20 are connectable to the inflow and outflow ports of the regulator body 2a by the connecting bracket 1. The connecting structure has the connecting bracket 1 and the filter 19 similar to the case where the filter 19 is connected to the regulator 2.

The inflow port of the lubricator 20 has its structure substantially similar to the case of the pipe coupling 5b on the outflow side.

The operation of the embodiment will next be described.

As shown in FIGS. 1A and 1B, in the case of the regulator only, the pipe coupling 5a on the inflow side and the pipe coupling 5b on the outflow side, which have mounted thereon their respective O-rings 10 and 10, are first fitted respectively into the inflow port 3 and the outflow port 4 of the regulator body 2a respectively.

Then, the bracket bodies 1a and 1a of the connecting bracket 1 are mounted respectively to the fitting grooves 12 and 12 in the regulator body 2a through attaching or mounting screws 15. At this time, the pawl sections 17 and 17 of each of the bracket bodies 1a and 1a are hooked respectively to the engaging sections 18 and 18 formed on the outer peripheral surfaces of the pipe couplings 5a and 5b. The pipe couplings 5a and 5b are urged respectively against the inflow port 3 and the outflow port 4 of the regulator body 2a by engagement between the tapering sections 16 and 16 and the opening ends of the engaging section 18 and 18, and are fitted in the inflow port 3 and the outflow port 4 under the sealed condition. In this state, it is possible to connect the pipes respectively to the pipe couplings 5a and 5b by threaded engagement.

Only replacement of the pipe couplings 5a and 5b in the manner described above enables diameter of the pipe connected to the inflow and outflow ports 3 and 4 of the regulator body 2a to be selected optionally.

As shown in FIGS. 2A and 2B, in the case where the filter 19 is connected to the regulator 2, the filter 19 and the pipe coupling 5b on the outflow side both having respective O-rings are first fitted respectively in the inflow port and the outflow port of the regulator body 2a.

Then, the bracket bodies 1a and 1a of the connecting bracket 1 are mounted respectively in the fitting grooves 12 and 12 in the regulator body 2a through the attaching screws 15. At this time, the filter 19 and the pipe coupling 5b on the outflow side are connected through a process similar to the case of the regulator only.

With regard to the side of the outflow port of the regulator body 2a, similarly to the case of the aforementioned regulator only, replacement of the pipe coupling 5b enables the diameter of a pipe connected to the side of the outflow port of the regulator body 2a to be selected optionally.

Further, since the arrangement is such that the filter 19 is connected to the inflow port of the regulator body 2a by means of fitting, it is possible to reduce the entire length. Furthermore, a nipple can be dispensed with, making it possible to reduce the number of parts and to improve the attaching ability.

Moreover, since the arrangement is such that the filter 19 is connected to the inflow port of the regulator body 2a by means of fitting, it is possible to connect the filter 19 to the regulator 2 without occurrence of air leakage, such that the filter 19 is directed in the same direction as the regulator 2.

As shown in FIGS. 3A and 3B, in the case where the filter 19 and the lubricator 20 are connected to the regulator 2, the filter 19 and the lubricator 20 having their respective O-rings are first fitted respectively in the inflow port and the outflow port of the regulator body 2a.

Then, the bracket bodies 1a and 1a of the connecting bracket 1 are mounted respectively in the fitting grooves 12 and 12 in the regulator body 2a through the attaching screws 15. At this time, the filter 19 and the lubricator 20 are connected through a process similar to the aforesaid case of regulator only.

Thus, since the arrangement is such that the filter 19 and the lubricator 20 are connected respectively to the inflow port and the outflow ports of the regulator body 2a by means of fitting, the entire length is further reduced. Furthermore, a pair of nipples can be dispensed with, making it possible to reduce the number of parts and to improve the attaching ability.

Moreover, since the arrangement is such that the filter 19 and the lubricator 20 are connected respectively to the inflow port and the outflow port of the regulator body 2a by means of fitting, it is possible to connect the filter 19 and the lubricator 20 to the inflow and outflow ports of the regulator 2 without occurrence of air leakage, such that the filter 19 and the lubricator 20 are directed in the same direction of the regulator 2.

Accordingly, the pipe couplings or various air conditioning units can be connected to the inflow and outflow ports of the regulator body 2 by the connecting bracket 1, making it possible to modularize connection of the pneumatic air conditioning units such as the filter 19 and the like to the regulator 2.

Another embodiment of the invention will next be described with reference to FIGS. 4, 5, 6A and 6B.

The gist of the embodiment resides in a structure for mounting a pressure gage to the regulator 2 in the case where the lubricator 20 or the filter (not shown) is connected to the regulator 2. The structure for mounting the pressure gage to the regulator 2 is arranged such that a pressure gage G can be mounted to the regulator 2 simultaneously with mounting of the connecting bracket 1.

Specifically, one of the bracket bodies 1a of the connecting bracket 1 has, at its center, the pressure-gage accommodating section 13. The pressure gage G is accommodated in the pressure-gage accommodating section 13. The pressure-gage accommodating section 13 is composed of a smaller-diameter accommodating portion 13a and a larger-diameter accommodating portion 13b corresponding to a stepped configuration of the pressure gage G. The arrangement is as follows. That is, the smaller-diameter accommodating portion 13a projects inwardly, and is formed, at its center, with a mounting bore 22. The pressure gage G is mounted in the mounting bore 22 by means of threaded engagement.

Figure 4:
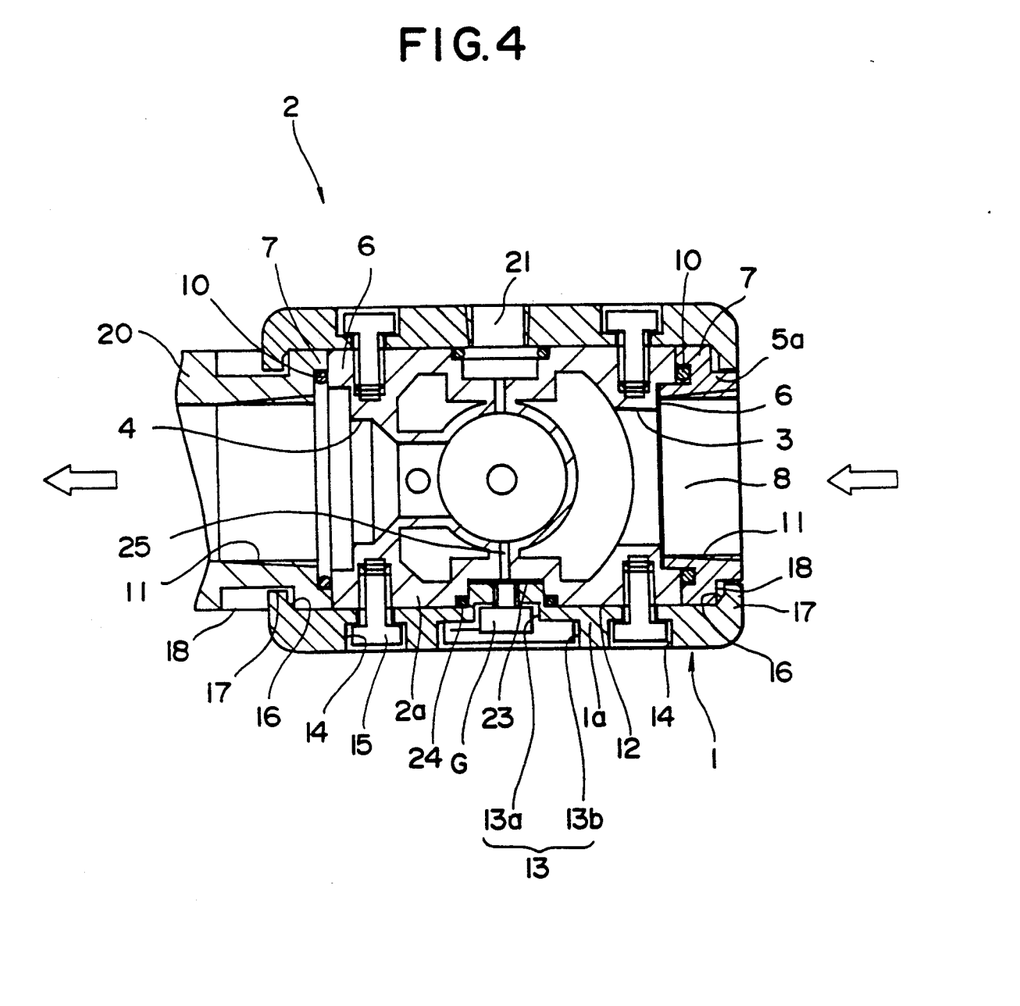
FIG. 4 is a cross-sectional view taken along the line IV—IV in FIG. 5, showing a structure for mounting a pressure gage to a regulator, according to another embodiment of the invention.
Figure 5:
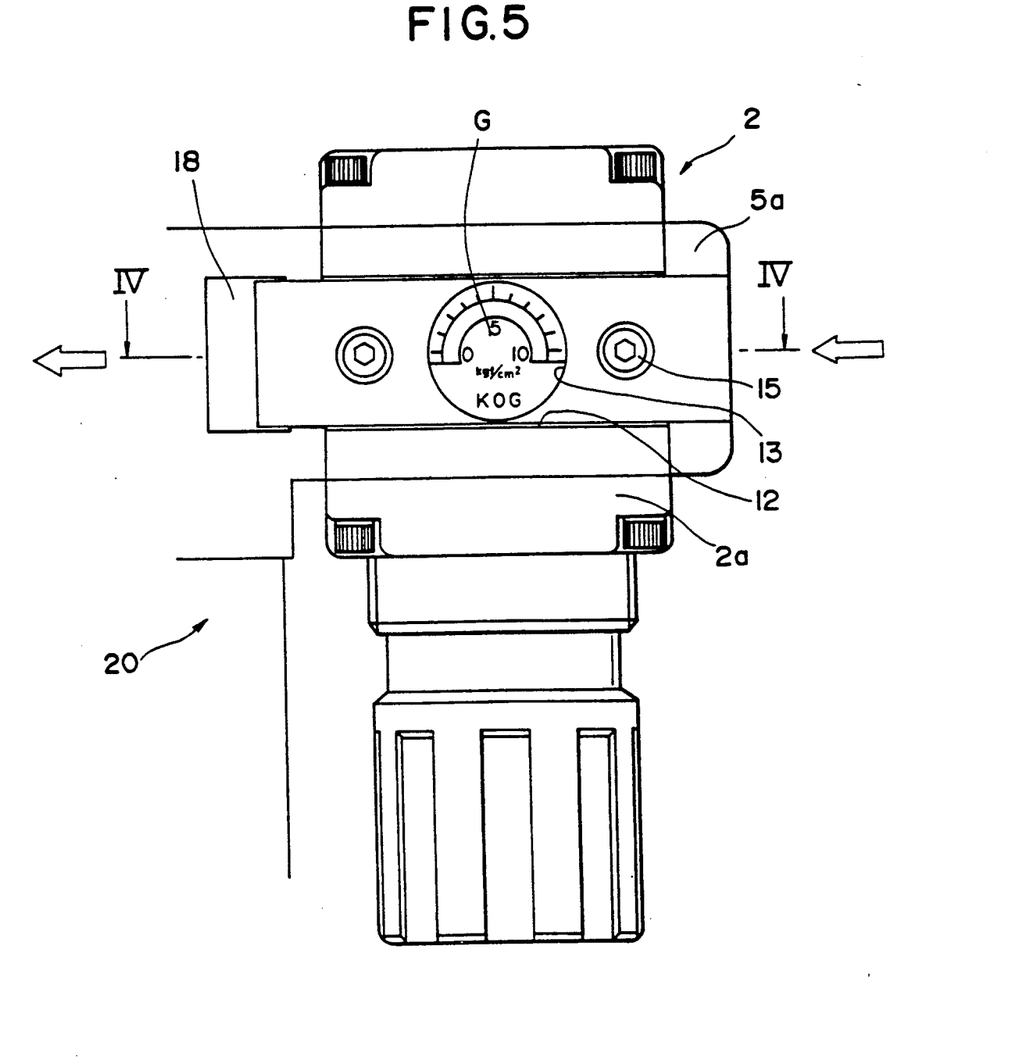
FIG. 5 is a side elevational view of the structure for mounting the pressure gage to the regulator illustrated in FIG. 4.
Figure 6A:
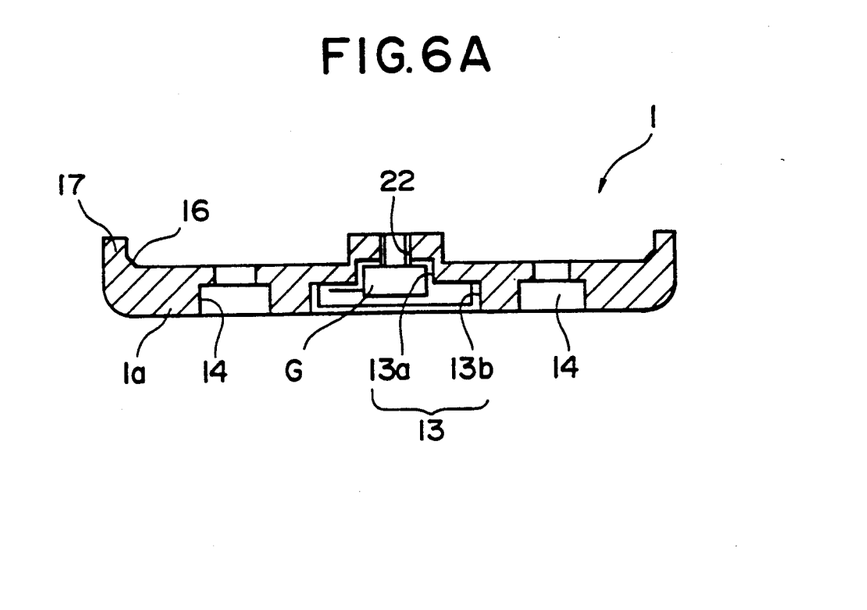
FIGS. 6A and 6B are respectively a cross-sectional view and a front elevational view of a connecting bracket illustrated in FIGS. 4 and 5.
Figure 6B:
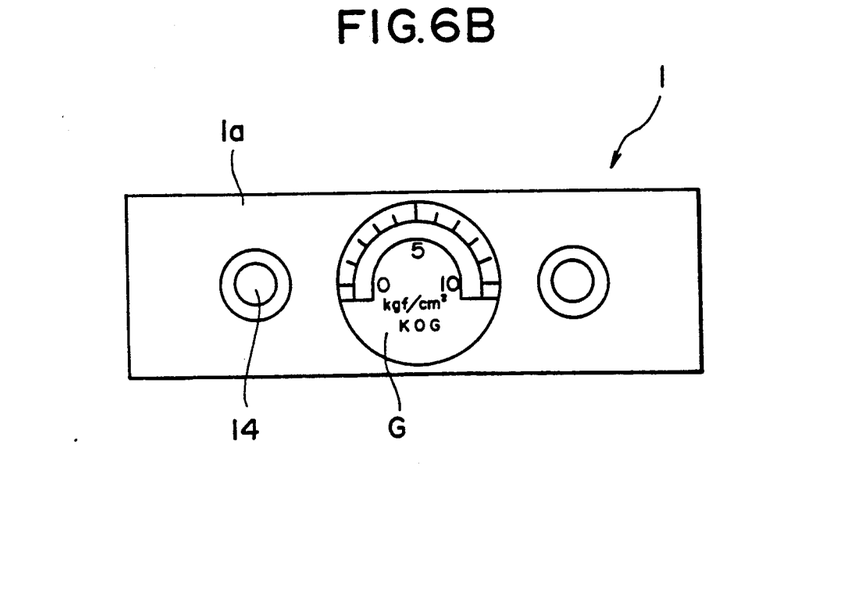

The regulator body 2a is formed with a fitting portion 23 which is fitted about the smaller-diameter accommodating portion 13 when the connecting bracket 1 is mounted on the regulator body 2a. An O-ring 24 is fitted in an opening end of the fitting portion 23. A through bore 25 is formed at the center of the fitting portion 23 such that pneumatic pressure within the regulator body 2a is supplied to the aforesaid built-in pressure gage G.

The operation of the embodiment will next be described.

At the time of mounting the pressure gage G on the regulator 2, the connecting bracket 1 having incorporated therein the pressure gage G, in which the pressure gage G is previously mounted on the connecting bracket 1 by means of threaded engagement, is used. The lubricator 20 and the pipe coupling 5a on the side of the inflow port are connected to the regulator 2 by the connecting bracket 1. Instead of the pipe coupling 5a, the filter may be connected to the inflow port of the regulator 2.

Specifically, the lubricator 20 and the pipe coupling 5a on the side of the inflow port, which have their respective O-rings 10 and 10, are first connected to or fitted in the outflow port 4 and the inflow port 3 of the regulator body 2a.

Subsequently, the bracket bodies 1a and 1a of the connecting bracket 1 are mounted respectively in the fitting grooves 12 and 12 of the regulator body 2a through the attaching screws 15. At this time, the pawl sections 17 and 17 of each of the bracket bodies 1a are hooked respectively to the engaging sections 18 and 18 which are formed respectively on the lubricator 20 and the outer peripheral surface of the pipe coupling 5a on the side of the inflow port. The lubricator 20 and the pipe coupling 5a on the side of the inflow port are urged respectively against the outflow port 4 and the inflow port 3 of the regulator body 2a by means of engagement between the tapering sections 16 and 16 and the engaging sections 18 and 18, and are connected under a sealed condition.

In the manner described above, since the arrangement is such that the pressure gage G is incorporated in the connecting bracket 1, it is possible to mount the pressure gage G on the regulator 2 simultaneously with mounting of the connecting bracket 1, and to modularize connection of the lubricator 20, the filter or the pipe coupling 5a to the regulator 2.

Further, since the arrangement is such that the connecting bracket 1 having incorporated therein the pressure gage G can be mounted on and demounted from the regulator body 2a, it is possible to easily mount and demount the pressure gage G together with the connecting bracket 1 on and from the regulator body 2a.

Furthermore, the arrangement, in which the pressure gage G is incorporated in the connecting bracket 1, enables the regulator to be reduced in size, making it possible to make the regulator look more attractive on external appearance.

Still another embodiment will next be described with reference to FIGS. 7, 8, 9A and 9B.

The gist of the embodiment resides in the fact that a pressure display unit or a pressure gage G can practice pressure detection, pressure display, pressure setting and giving the alarm for abnormality of the pressure on a secondary side or the outflow side of the regulator 2, and that the pressure gage G is incorporated in the connecting bracket 1 in a built-in manner.

Specifically, one of the bracket bodies 1a of the connecting bracket 1 is formed with a pressure display section Ga which has such a function as to digital-display detected pressure, setting pressure and the like by means of liquid-crystal display.

Further, the connecting bracket 1 is provided with a setting-value UP key 28 and a setting-value DOWN key 29. These keys 28 and 29 are employed for increasing and decreasing upper and lower limits to practice pressure setting.

Furthermore, a zero-point adjusting switch 26 and a mode switch 27 are mounted on the connecting bracket 1. The zero-point adjusting switch 26 is used so that applied pressure is adjusted to the atmospheric pressure. The mode switch 27 is employed when modes such as a detecting mode, a setting mode and the like are switched.

Figure 7:
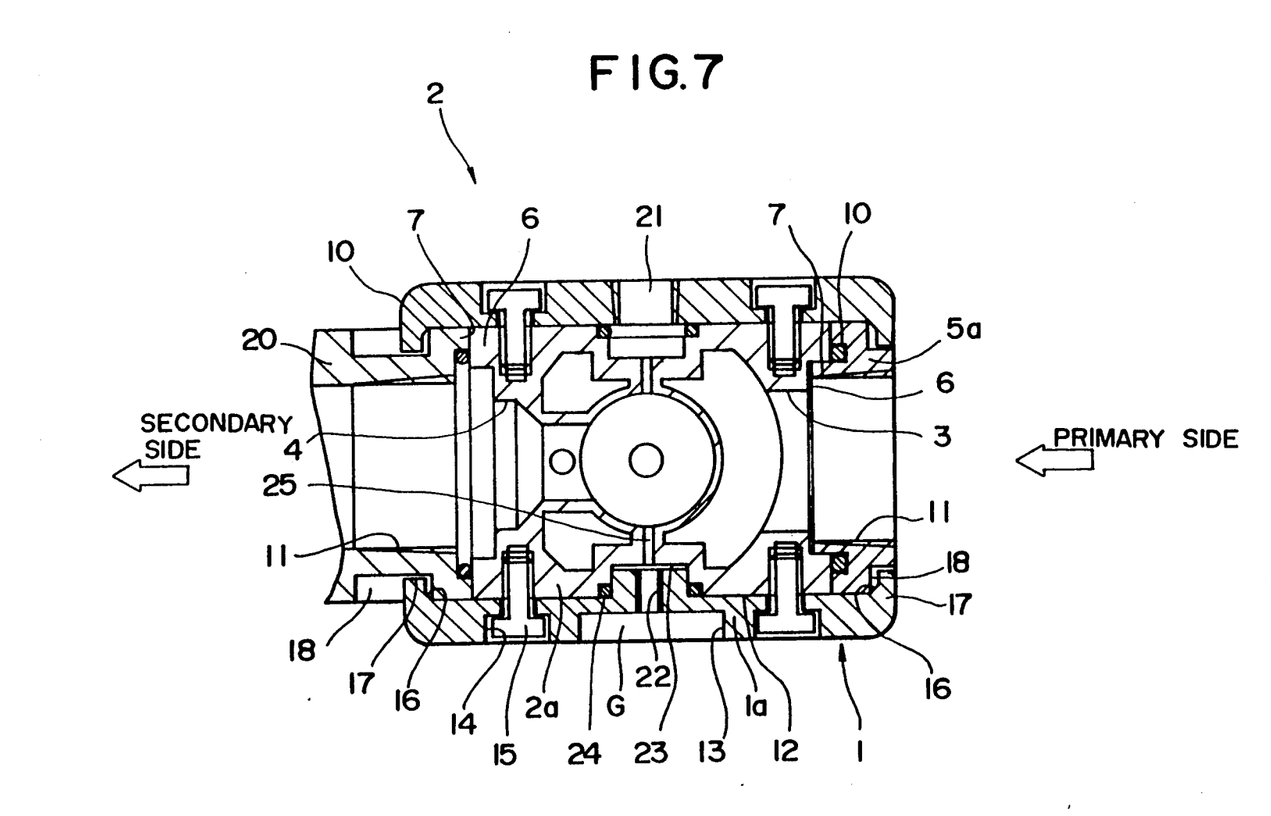
FIG. 7 is a cross-sectional view taken along the line VII—VII in FIG. 8, showing a regulator having a pressure gage, according to still another embodiment of the invention.
Figure 8:
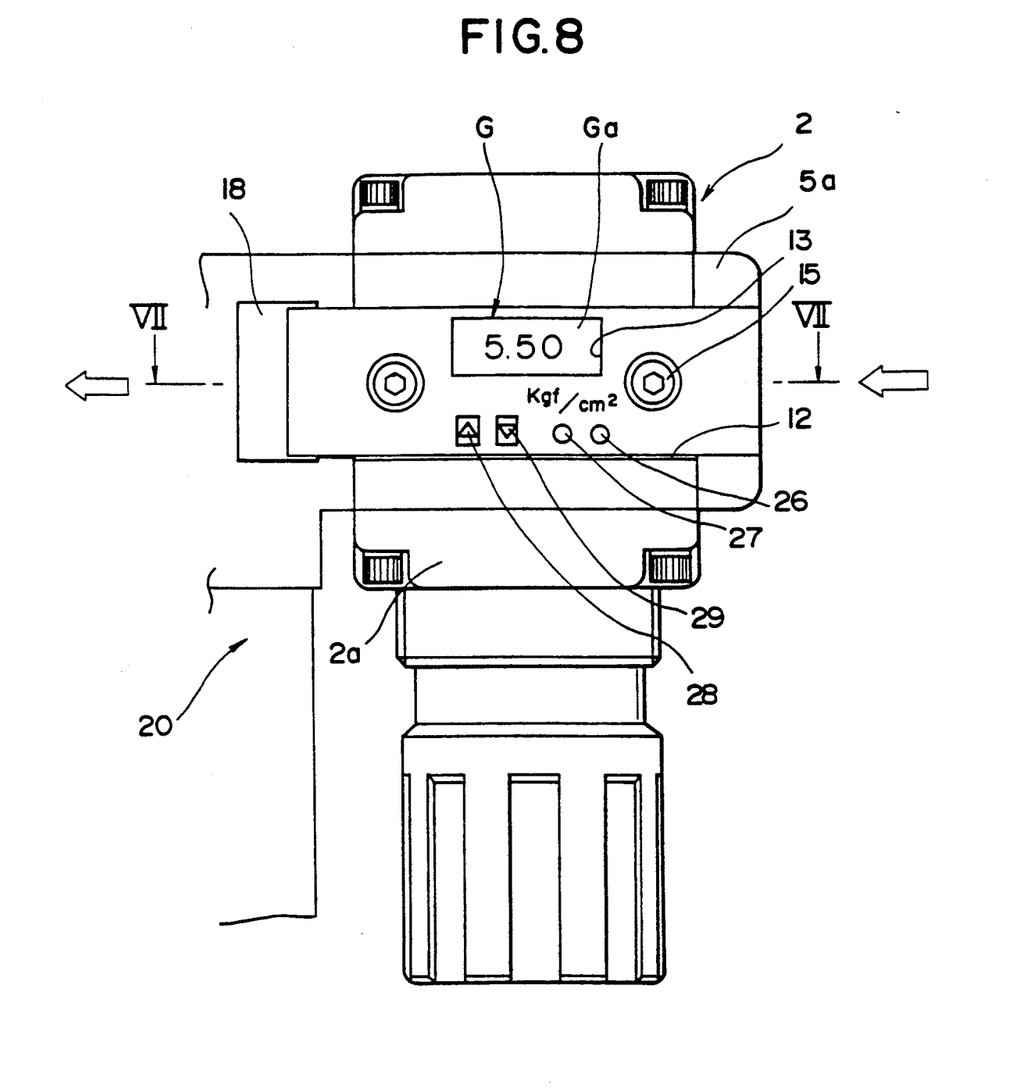
FIG. 8 is a front elevational view of the regulator having the pressure gage illustrated in FIG. 7.
Figure 9A:
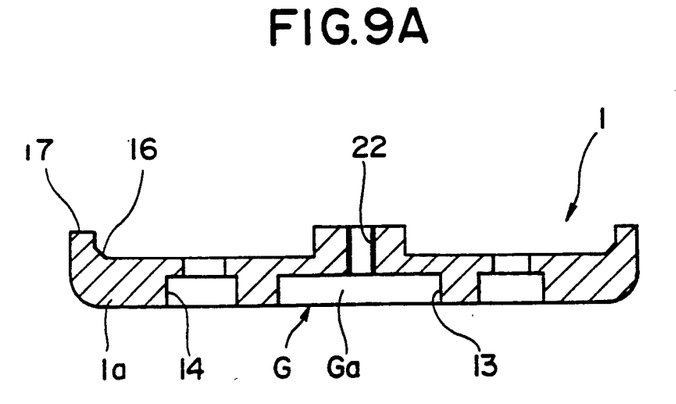
FIG. 9A and 9B are a cross-sectional view and a front elevational view of a connecting bracket illustrated in FIGS. 7 and 8.
Figure 9B:
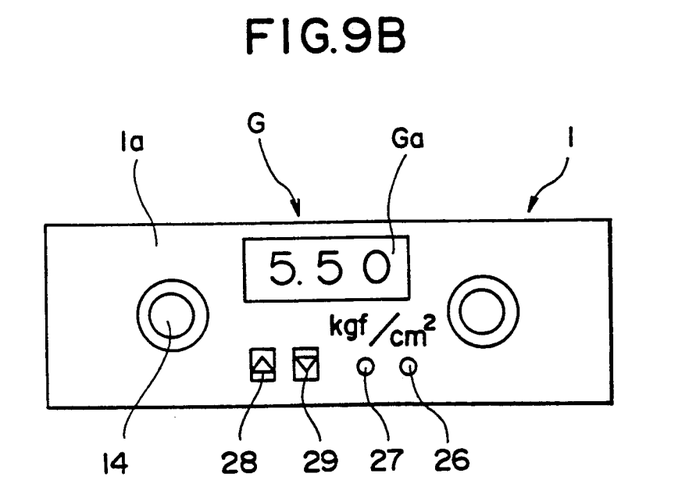

Moreover, the pressure gage G is provided therewith a pressure detecting section for detecting secondary pressure of the regulator 2, a control section provided with an A/D converter element and the like for output of a digital signal corresponding to a detected signal from the pressure detecting section, and an abnormality alarm section for giving the alarm for abnormality deviating from the setting pressure.

The operation of the embodiment will next be described.

In the regulator 2 having the pressure gage G in which the pressure gage G is incorporated in the connecting bracket 1, the secondary pressure is detected by the pressure detecting section, and the detected secondary pressure is displayed by the pressure display section Ga. The setting-value UP key 28, the setting-value DOWN key 29 and the like are manipulated to set the secondary pressure, while viewing the displayed secondary pressure. The alarm for abnormality deviating from the set secondary pressure can be given by the abnormality alarm section.

An actuator can be controlled in response to the alarm from the abnormality alarm section.

For example, in the case where an air chuck clamp is operated in a pneumatic system, it is possible to use the pressure gage G in control of an air-chuck clamp force.

Specifically, a controller is provided between an electromagnetic valve and the pressure gage G incorporated in the connecting bracket 1 of the regulator 2.

When the secondary pressure is within the set upper and lower limit values, the abnormality alarm section incorporated in the pressure gage G detects the secondary pressure and transmits an ON signal to the controller. The controller commands the electromagnetic valve to enable opening and closing operation, on the basis of the transmitted ON signal.

When the secondary pressure is out of the set upper and lower limit values, this is detected by the abnormality alarm section. Then, an OFF signal is tranmitted by the abnormality alarm section to the controller, which in turn commands the electromagnetic valve to prohibit the opening and closing operation, on the basis of the transmitted OFF signal.

By doing so, it is possible to control the air-chuck clamp force within the set range.

Further, the pressure gage G is easily mountable and demountable together with the connecting bracket 1 on and from the regulator, attaining reduction in size and integration.

As mentioned above, the invention made by the inventors has been described in detail with reference to the various embodiments. However, the invention should not be limited to the embodiments. It is needless to say that various modifications and variations may be made to the invention without departure from the scope of the invention.

For example, in the aforesaid embodiments, the structure for connection of the air conditioning units in a pneumatic system has been described with reference to the case of the regulator only, the case where the filter is connected to the regulator, and the case where the filter and the lubricator are connected to the regulator. However, the invention should not be limited to these cases. Advantages similar to those described previously can be produced with references to a structure for connection of the air conditioning units instruments in the case where only the lubricator is connected to the regulator.

Further, in the aforementioned embodiments, the structure for mounting the pressure gage to the regulator has been described in the case where the lubricator in connected to the regulator. However, the invention should not be limited to the mounting structure. Advantages similar to those of the aforesaid embodiments can be produced also in the structure for mounting the pressure gage to the regulator in the case where the regulator is used in a single unit, or the case where the filter and the lubricator are connected to the regulator.

Furthermore, the structure of the pressure gage may have any one of various structures other than that using a Bourdon tube.

Moreover, in the aforementioned embodiments, the case has been described where the pressure gage G is used in control of the air-chuck clamp force. The invention should not be limited to this case. For example, the pressure gage G where the modes are switched to hysteresis mode by the mode switch 27 to confirm seating of a work or suction thereof may be used.

Further, incorporation of the pressure gage G in the connecting bracket 1 is not necessarily limited to perfect bulid-in type, but may be such a structure that the pressure gage G projects from the face of the connecting bracket 1.

Advantages produced by typical embodiments of the invention are described as follows:

(1) Various air conditioning units can be connected to the inflow and outflow ports of the regulator body by the connecting bracket, making it possible to modularize connection of the air the conditioning units to the regulator.

(2) Particularly, in the case where the regulator is used in a single unit, it is possible to optionally select the diameter of the pipes connected to the inflow and outflow ports of the regulator body.

(3) Furthermore, in the case where the filter is connected to the regulator, the entire length can be reduced, and the pipe diameter on the side of the outflow port can optionally be selected. Furthermore, the number of parts can be reduced, and the mounting ability can be improved. Moreover, it is possible to connect the filter to the inflow port of the regulator body without occurrence of air leakage such that the filter is directed to the same direction as the regulator.

(4) Furthermore, in the case where the filter and the lubricator are connected to the regulator, the entire length can further be reduced, the number of parts can be reduced, and the mounting ability can be improved. Moreover, the filter and the lubricator can be connected respectively to the inflow and outflow ports of the regulator body without occurrence of air leakage such that the filter and the lubricator are directed to the same direction as the regulator.

(5) The arrangement is provided with the connecting bracket for connecting other air conditioning units to the regulator under such a condition that the other air conditioning units are fitted in the regulator in a sealed manner and is such that the pressure gage is incorporated in the connecting bracket. Accordingly, it is possible to mount the pressure gage on the regulator simultaneously with mounting of the connecting bracket, and it is possible to modularize connecting of the air conditioning units to the regulator.

(6) Furthermore, since the connecting bracket having incorporated therein the pressure gage is of such a structure as to be easily detachable, it is possible to easily mount and demount the pressure gage on and from the regulator body together with the connecting bracket.

(7) Moreover, by the structure in which the pressure gage is incorporated in the connecting bracket, it is possible to reduce the size or dimension of the regulator, and to make the regulator look more attractive on external appearance.

(8) The regulator having the pressure gage, according to the invention, is of such a structure as to be provided with the pressure gage which comprises the pressure detecting section for detecting the secondary pressure of the regulator, the pressure display section for displaying the detected secondary pressure, the pressure setting section for setting the secondary pressure, and the abnormality alarm section for giving the alarm for abnormality deviating from the setting pressure. Accordingly the secondary pressure can be detected by the pressure detecting section, and the detected secondary pressure can be displayed by the pressure display section. The secondary pressure can be set by the pressure setting section, and the alarm for abnormality deviating from the set secondary pressure can be given by the abnormality alarm section. Thus, it is possible to control an actuator on the basis of the alarm for abnormality from the abnormality alarm section.

(9) The regulator having the pressure gage, according to the invention, is of such a structure that the pressure gage is incorporated in the connecting bracket for connecting other pneumatic air condigioning units to the regulator. Accordingly, in addition to the aforementioned advantages, mounting and demounting of the pressure gage can be made easy, and reduction in size and integration can be attained.

What is claimed is:

1. A regulator for a pneumatic system, the regulator comprising: a regulator body having and inflow port and an outflow port; and a connecting bracket for connecting air conditioning units other than a regulator to said regulator body, said connecting bracket being provided with a pair of tapering sections for urging said other air conditioning units respectively against said inflow and outflow ports of said regulator body when said connecting bracket is mounted on said regulator body, wherein a structure for connection of said air conditioning units to said regulator body is modularized by said connecting brackets.

2. A regulator according to claim 1, wherein said connecting bracket includes a pair of projection-like pawl sections contiguous to said tapering sections at each of two axial ends of said connecting bracket, wherein said pawl sections are engageable respectively with a pair of engaging sections formed respectively on outer peripheral surfaces of said air conditioning units.

3. A regulator for pneumatic systems, a regulator comprising: a regulator body formed at each of two side surfaces with a pair of fitting grooves; and a connecting bracket for connecting air conditioning units other than the regulator to said regulator body, said connecting bracket having a pair of bracket bodies which are fitted respectively in said fitting grooves, wherein a structure for connection of said air conditioning units to said regulator body is modularized by said connecting brackets.

4. A regulator for pneumatic systems, the regulator comprising: a regulator body having an inflow port and an outflow port for pneumatic-pressure fluid; a connecting bracket for connecting air conditioning units other than the regulator to said regulator body, one of said air conditioner units connected to said inflow and outflow ports being a pipe coupling, said inflow port and said outflow port of said regulator body having respective female-type stepped opening ends, wherein said air conditioning units are provided with respective male-type stepped opening ends which are fitted respectively in said female-type stepped open ends, wherein a structure for connection of said air conditioning units to said regulator body is modularized by said connecting bracket.

5. A regulator for pneumatic systems, the regulator comprising: a regulator body; and a connecting bracket for connecting air conditioning units other than the regulator to said regulator body, said connecting bracket being provided with a bracket body having pressure-gage accommodating recess and a pressure-gage incorporated in said pressure-gage accommodating recess, wherein pneumatic pressure within said regulator body is supplied to said pressure gage incorporated in said connecting bracket, and wherein said pressure-gage detects a pressure value of secondary pneumatic pressure within said regulator body and wherein said pressure-gage comprises a pressure detecting section for detecting the secondary pressure of the regulator, a pressure display section for displaying the detected secondary pressure, a pressure setting section for setting said secondary pressure, and an abnormality alarm section for providing an alarm for abnormal deviations from a set pressure, wherein a structure for connection of said air conditioning units to said regulator body is modularized by said connecting brackets.

6. A regulator according to claim 1, wherein said other air conditioning units include at least one of a lubricator and a filter for conditioning air as a pneumatic pressure fluid.

* * * * *